United States Patent [19]

Gundlach

[11] Patent Number: 4,596,458

[45] Date of Patent: Jun. 24, 1986

[54] METHOD AND APPARATUS FOR MAKING A FREE VISION THREE-DIMENSIONAL IMAGE EMPLOYING PORTABLE EQUIPMENT AND PROVIDING INCREASED SPEED AND WITH ENHANCED VERSATILITY

[75] Inventor: Gregory E. Gundlach, Chicago, Ill.

[73] Assignee: Gregory Barrington, Ltd., Pittsford, N.Y.

[21] Appl. No.: 570,521

[22] Filed: Jan. 13, 1984

[51] Int. Cl.⁴ ................. G03B 27/32; G03B 35/14
[52] U.S. Cl. ................................. 355/22; 354/112; 355/77
[58] Field of Search ............... 355/22, 77; 354/112; 156/58

[56]  References Cited

U.S. PATENT DOCUMENTS

| | | | |
|---|---|---|---|
| 1,905,469 | 4/1933 | Ives | 355/22 X |
| 1,942,638 | 1/1931 | Draper | 354/112 X |
| 2,314,174 | 3/1940 | Steinman | 350/130 X |
| 2,508,487 | 5/1950 | Bonnet | 354/112 |
| 3,392,647 | 7/1968 | Bartholomew | 354/112 |
| 3,491,669 | 1/1970 | McBride | 354/112 |
| 3,528,736 | 9/1970 | Jones | 355/22 |
| 3,560,296 | 2/1971 | Anderson | 156/58 X |
| 3,608,457 | 9/1971 | Barker | 354/112 |
| 3,678,833 | 7/1972 | Leach | 354/112 |
| 3,769,890 | 11/1973 | Alasia | 350/130 X |
| 3,800,307 | 3/1974 | Wechsler | 354/112 |
| 4,128,324 | 12/1978 | Seeger | 354/112 |
| 4,158,501 | 6/1979 | Smith et al. | 354/112 X |
| 4,478,639 | 10/1984 | Smith et al. | 355/22 X |
| 4,481,050 | 11/1984 | Gundlach et al. | 156/58 |

OTHER PUBLICATIONS

N. A. Valyus, Stereoscopy, (1966), pp. 117–128.

Primary Examiner—Richard A. Wintercorn
Attorney, Agent, or Firm—David E. Fitchenik

[57] ABSTRACT

A method and apparatus for making three-dimensional photographs involve projecting from a fixed position a first one of a series of images in a predefined projected image area on a structure, moving the structure and projecting from the fixed position a second one of the series of images on the structure in the predefined image area. The structure includes a raster mounted to a spacer which supports a film stock on an opposing side. Exposure of the film is controlled by a shutter on the raster side of the structure. Also disclosed are various photograph structures employed to obtaining the series of images to be projected and various constructions of the structure related to making the three-dimensional photographs in addition to the techniques for establishing the predefined image area.

23 Claims, 11 Drawing Figures

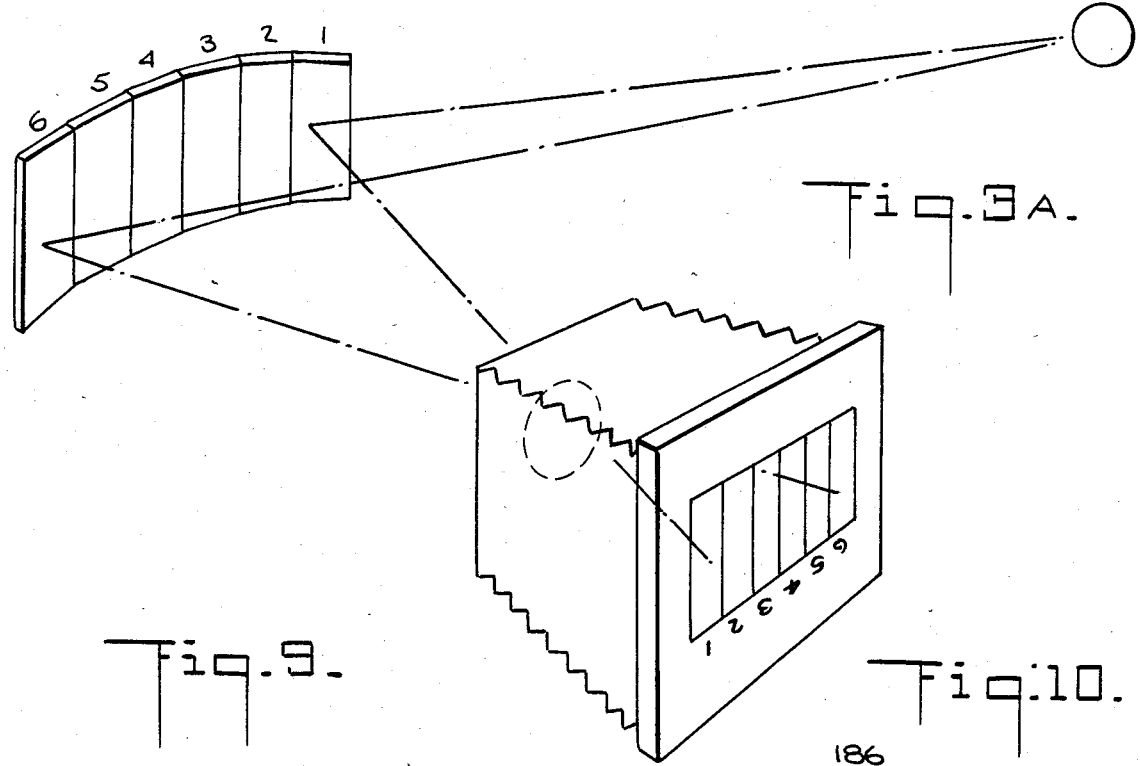
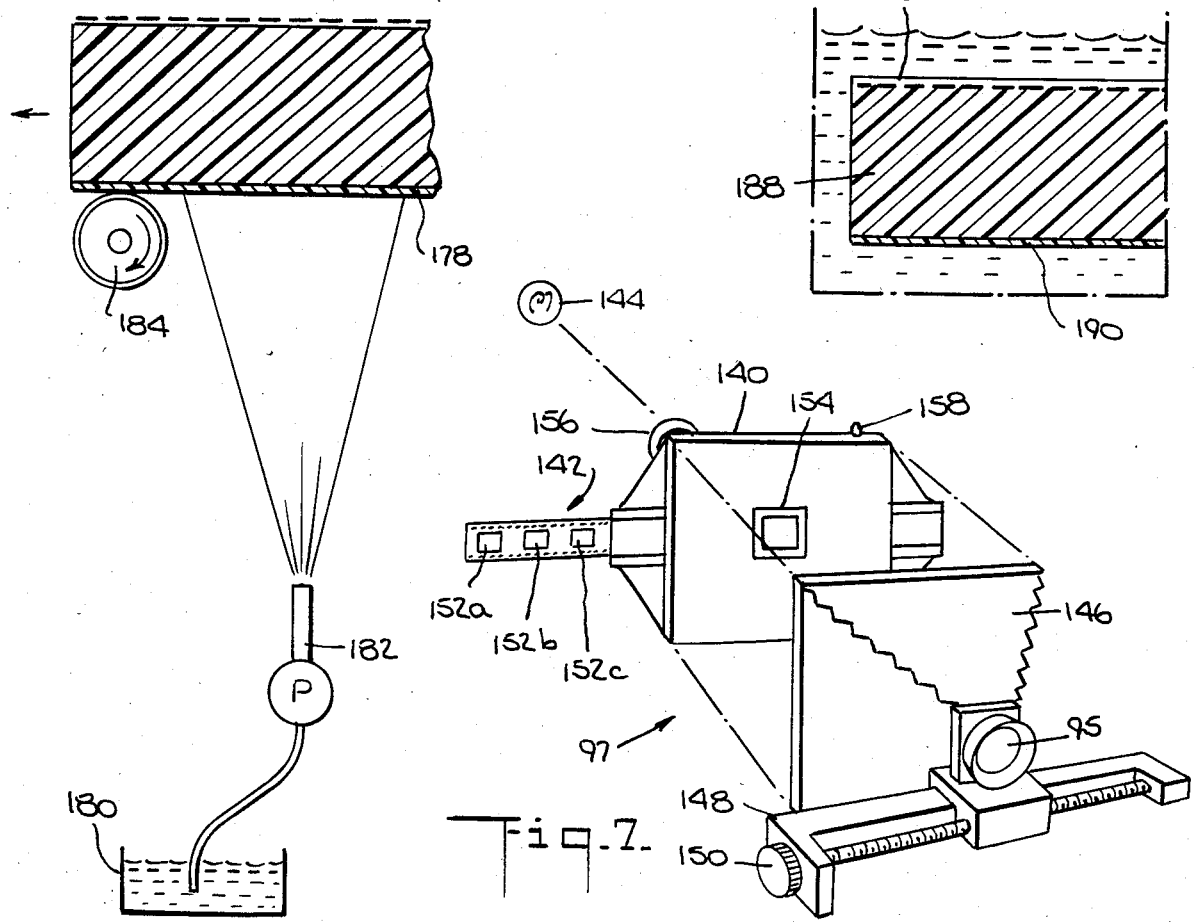

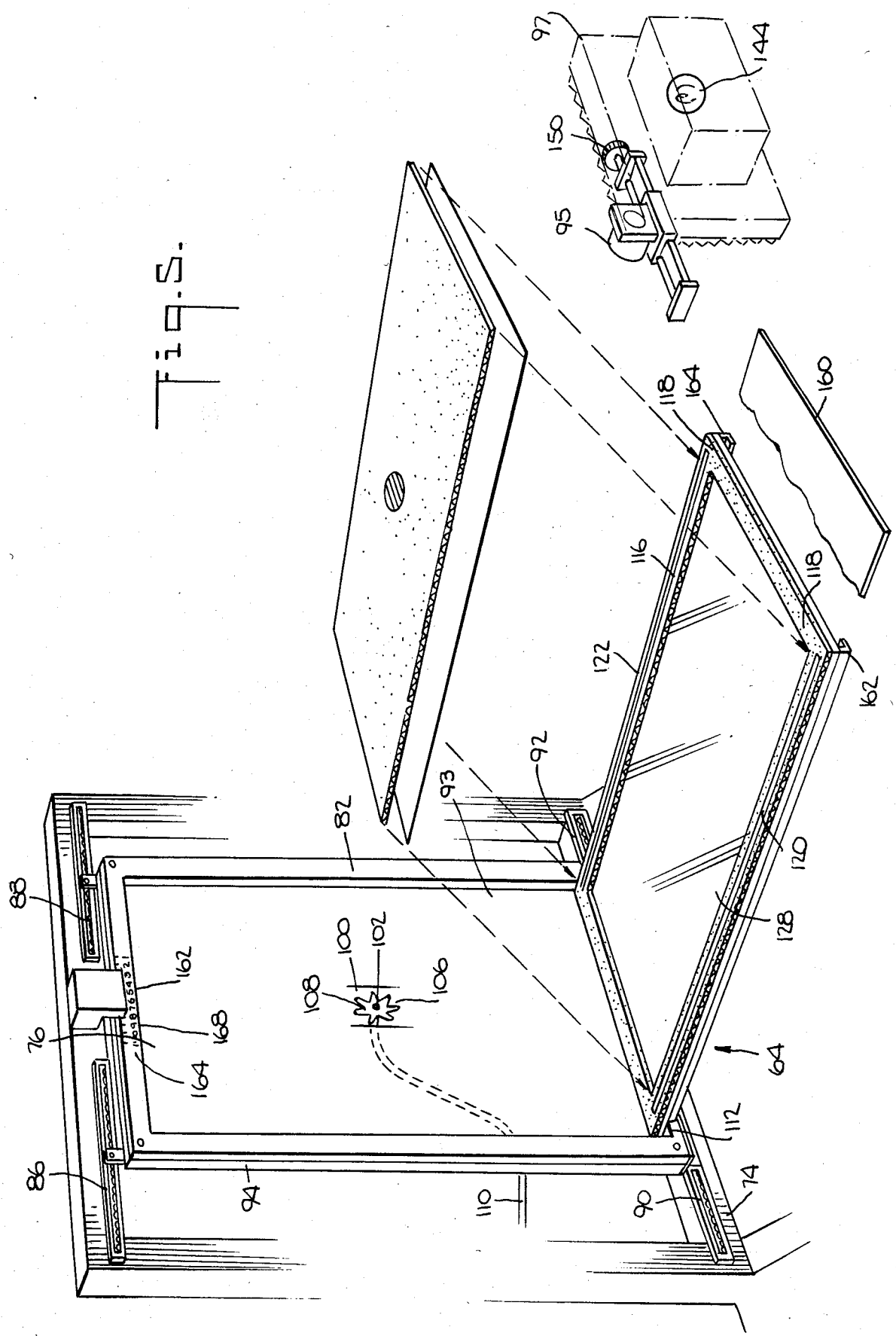

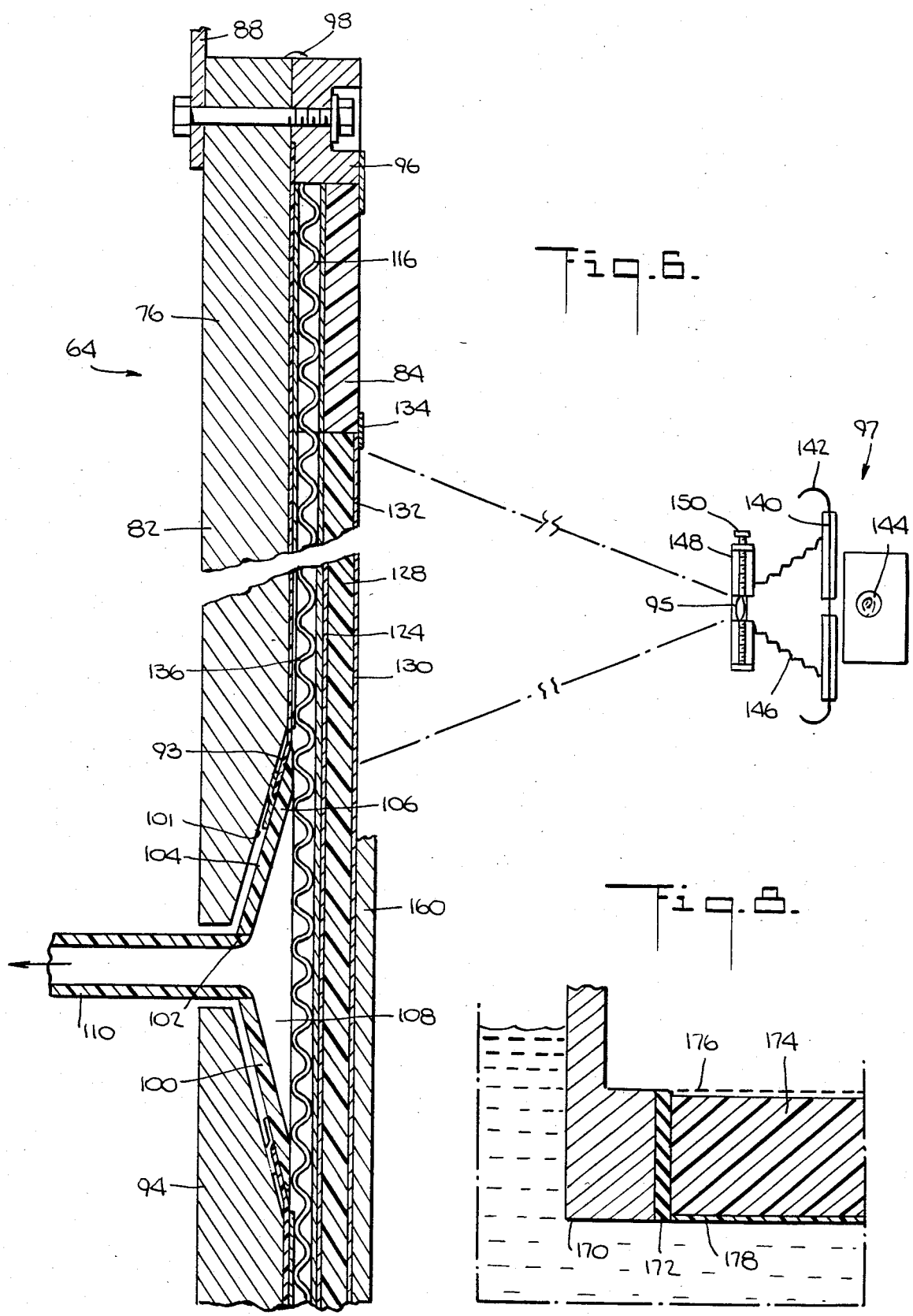

METHOD AND APPARATUS FOR MAKING A FREE VISION THREE-DIMENSIONAL IMAGE EMPLOYING PORTABLE EQUIPMENT AND PROVIDING INCREASED SPEED AND WITH ENHANCED VERSATILITY

RELATED APPLICATIONS

Reference is made to U.S. patent application Ser. No. 417,855, now U.S. Pat. No. 4,481,050, Sept. 14, 1982, for Gundlach et al, entitled IMPROVED METHOD OF MAKING A THREE-DIMENSIONAL PHOTOGRAPH AND PHOTOGRAPH RESULTING THEREFROM and assigned to the present assignee, the disclosure of which is hereby incorporated by reference.

FIELD OF THE INVENTION

The present invention relates to both a method and apparatus for making a three-dimensional appearing image. More specifically, the present invention relates to a method and apparatus for making a free vision three-dimensional photograph which employs portable camera equipment and projection printing equipment to achieve increased speed and enhanced versatility. A free vision 3-dimensional photograph is one viewed by the unaided eye.

BACKGROUND OF THE INVENTION

Methods and apparatus have been developed for generating three-dimensional photographs. One such system utilizes a camera with a film mount therein, a line raster, a film and a separator for keeping the line raster separated from the film. A vacuum generating device maintains a vacuum in the vicinity of the separator. This brings the film into intimate contact with the separator and maintains the intimate contact through successive exposures and movement of the film and line raster. After repeated exposure of the film in various positions with respect to the subject being photographed, the exposed film is removed and developed. The developed film and a raster are again assembled on a separator. The resulting photograph is viewed from the raster side of the assembly by means of a light source and a diffusion screen behind the film side of the assembly. This system is disclosed in detail in U.S. patent application Ser. No. 417,855, now U.S. Pat. No. 4,481,050, filed Sept. 14, 1982, for Gundlach et al and entitled IMPROVED METHOD OF MAKING A THREE-DIMENSIONAL PHOTOGRAPH AND PHOTOGRAPH RESULTING THEREFROM.

The apparatus employed in the above noted U.S. patent application employs full size equipment. That is, the original film which is exposed and developed is the same size as the three dimensional photographic print to be exhibited or viewed. The original developed film is employed as the first generation print to be viewed and is a free vision multi exposed single photograph being viewed with the naked eye. The process as described in the above noted application employs a dimensionally stable film having a low ASA rating, for example Ilford Cibachrome II CTD. 7 transparent film with a 0.18 millimeter transparent polyester base. The ASA rating of the Cibachrome II transparent film is about 1/54 of an ASA unit.

U.S. Pat. No. 3,560,296 for METHOD FOR PREPARING 3-DIMENSIONAL PICTURES relates to making lenticular screen stereographs. The apparatus for making these stereographs includes using a filmstrip with color separation and an enlarger in conjunction with a film sandwich. In the system disclosed in the patent, a stationary lenticular screen with a raster is used to enhance the lens quality of the lenticular screen. A film is located behind the lenticular screen and is advanced in increments in the order of one lenticular element (column 4, lines 47–75). In operation of the system, in each exposure, the film is moved transversely a minute distance measured in terms of a fraction of a width of one lenticule with respect to the screen as each transparency is projected through the projector (column 7, lines 18–35).

U.S. Pat. No. 4,158,501 for PROJECTION PRINTION METHOD AND APPARATUS relates to the mass production of lenticular screen stereoscopic photographs. Mechanical and optical sensors align serially projected images through a line grid between subsequent exposures. The paper is processed and laminated to lenticular screen. The structure disclosed in the patent employs a raster which is moved relative to a film to be exposed. The movement, as with the previous structure noted above, involves minute movement. The exposure onto the film or photosensitive material is made employing a movable line grid. A lenticular lens is superimposed over the developed picture to form the photograph. In column 12 of the patent, it is noted that the line grid and paper are movable together in horizontal increments; however, this reference refers back to a reference in column 10 wherein it is noted that relative movement occurs between the line grid and the paper. Accordingly, it is believed that although the line grid and paper are moved together in horizontal increments, a relative movement continues to exist which may involve movement between the line grid and paper possibly at different speeds or in different directions.

SUMMARY OF THE INVENTION

It has been discovered that the above discussed methods and systems for making a free vision three-dimensional photograph, particularly that disclosed in the above noted U.S. patent, are greatly enhanced in accordance with the present invention. The present invention enables the use of portable camera equipment for generating three-dimensional photographs. The process is greatly speeded up and made significantly more versatile by reducing the exposure time of the original image to be photographed. The process according to the present invention employs a faster film requiring less illumination of the subject. In addition to these advantages, less exposure time is required when making prints (whether enlarged or reduced) of the photographed subject. As a result, less energy and labor are required to produce a three-dimensional photograph in accordance with the present invention. Additionally, the reduction in time in both taking the original photograph and in printing the three-dimensional photograph greatly reduces the risk when equipment can malfunction, such as by the failure of a vacuum pump or the burning out of an illumination bulb.

The process of the present invention enables special effects not previously available to be utilized. Not only can live subjects now be recorded but, because of the increased speed of film, stop action photography can be employed with the process and multiple images can be incorporated into the final print. For example, a high resolution, full scale image of a person can be placed in a foreign environment, such as a jar of peanut butter, using standard matte techniques. Low ASA film speeds and cumbersome apparatus made this prohibitive in prior art. Other special photographic effects can also be employed with the present invention.

A further advantage of the present invention involves the ability to use lenses in both the taking of the original photograph of the subject and in the reduction, enlargement or same size printing of the three-dimensional photographic print such that optimum viewing of the final three-dimensional print is not dependent upon the lens in the camera equipment used to take the original photograph of the subject. This is particularly important since the original above noted process disclosed in the U.S. patent application involved larger, more expensive lenses and involved exposure of a film which was the same size as and also usually constituted part of the final three dimensional photograph to be viewed.

In accordance with the present invention, it is no longer necessary to employ contact printing techniques to obtain multiple originals. Moroever, the present invention makes it possible to obtain enlarged or reduced photographic prints without the need to employ line rasters with different frequencies (lines per inch) as only one line raster is used in making each photograph although this raster can vary with the size of the photograph. Importantly, in accordance with the present invention the original film employed to photograph the subject need not be exposed through or aligned with a raster pattern. The present invention permits a high quality three-dimensional photographic print to be made without the need to move the object being photographed, although movement of the photographed object may still even further enhance the three-dimensional qualities of the final print. The present invention provides an intermediary film in the process for making the three-dimensional photographic print which results in the ability to used highly increased ASA rated film with advantages as compared with the previous process disclosed in the above-noted U.S patent application.

A method of forming a three-dimensional photograph embodying the present invention includes projecting images in a predetermined sequence from a film stock means having a plurality of images of a subject onto a structure, the structure includes an optically clear spacer, having parallel first and second surfaces. A raster is mounted to a first surface of the optically clear spacer, a photosensitive material is mounted to the second surface of the optically clear spacer and a shutter means is mounted between the raster side of said structure, and the first film stock means for controlling exposure of said second film stock means to projected images from the first film stock means.

The predetermined projecting sequence includes projecting a first one of the first film stock means images onto the structure and establishing a defined projected image area on said structure. The structure is thereafter moved and a second one of said developed film stock means images is projected onto the moved structure in the defined image area on the structure, but offset from the previous image.

The present invention also separately includes the projecting a fixed position, a first one of the film stock means images and thereafter moving the structure and projecting a second one of the film stock means images from the fixed position onto the moved structure in the predetermined image area by moving a lens system through which said first film stock means images are projected.

The present invention may employ an apparatus for forming a three-dimensional photograph, which includes means for projecting in a predetermined sequence a plurality of images on a first film stock means mounted within the projecting means. A structure is also provided which includes an optically clear spacer having parallel first and second surfaces, a raster mounted to a first surface of the optically clear spacer a second film stock means mounted to the second surface of said optically clear spacer and shutter means mounted to said raster side of the structure for controlling exposure of the second film stock means. A structure support means is coupled to the structure for movably supporting the structure with the shutter means facing the projecting means such that the projecting means is adapted to project an image of said plurality of image on the shutter means. The support means is adapted to move the structure in a substantially perpendiculat direction to the line of the axis of the images projected by said projecting means.

An apparatus embodying the present invention for forming a three-dimensional photograph may also include means for mounting a film stock means with the mounting means having an aperture for positioning a frame of film having an image to be projected and means for changing the frame of film in the aperture light source means is mounted on one side of said film support means aperture and a movable lens means is mounted on another side of the film support means. The movable lens means is adapted to be moved in a direction transverse ot the axis of projection of the images. The movable lens means is further adapted to focus the projected images on different lateral areas of a plane perpendicular to the plane of axis of said projected image by movement to the mavable lens means.

A feature of the present invention employs a photographic structure having a transparent spacer with first and second substantially parallel sides. A raster pattern is formed on a first of said spacer sides and a photosensitive material bonded to a second side of the spacer. The photosensitive material is uncovered such that a developer solution can directly contact the photoseneitive material for developnent whereby the photosensitive material may be developed without being removed. from the transparent spacer.

BRIEF DESCRIPTION OF THE DRAWINGS

Reference is now made to the drawings where like reference numerals designate similar elements in the various views, and in which:

FIGS. 3 and 3a are diagrammatic views of yet another embodiment of photographic apparatus for use in the present invention employing a single camera wherein multiple exposures of different views of a subject are imaged simultaneously onto an unexposed film, the camera structure and mirror structure being such that different portions of the film within the camera are separately imaged by the light reflected from each mirror;

FIG. 5 is a diagrammatic perspective view of the camera and film track of the photographic print apparatus of the present invention;

FIG. 6 is a top plan diagramatic view of the present invention detailing the construction of the photographic print apparatus and including the photographic film mount;

FIG. 7 is an exploded perspective view of the camera structure shown in FIG. 6 showing details of the enlarger movable lens structure; and FIGS. 8, 9, and 10 are diagramatic views of various different film print sandwich assemblies where the line raster need not be separated from the print film paper during the development process thereby eliminating any registration problems which may occur when removing and thereafter reattaching a line raster to a developed print for viewing.

DETAILED DESCRIPTION OF THE PREFERRED EMBODIMENT

Figure 1:
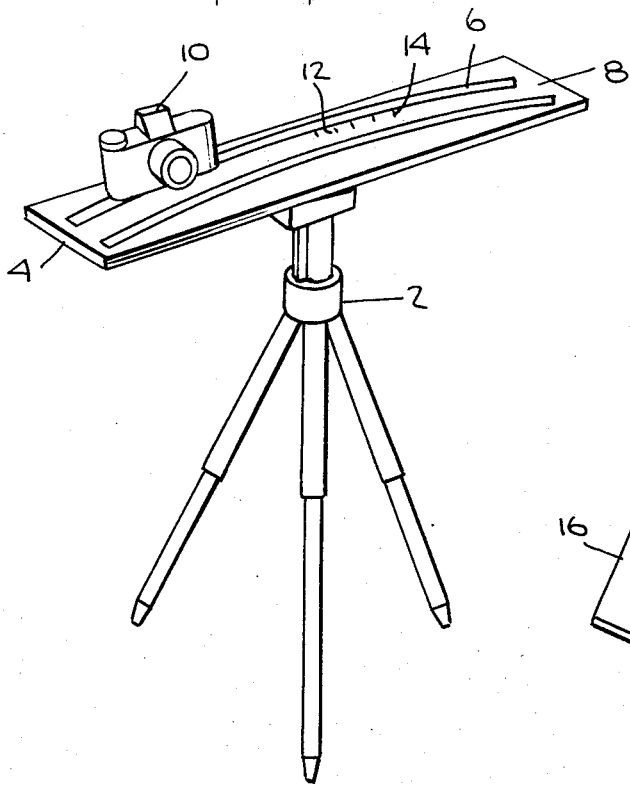
FIG. 1 is a diagrammatic view of a photographic apparatus for use in the present invention employing a camers on a movable track.

Reference is now made to FIG. 1. A tripod assembly 2 supports a shelf 4 having a series of tracks 6 and 8 for positioning a camera 10. The camera is slideably mounted in a selected track and may be locked at various registration points, such as those shown at 12 and 14 by means of a locking nut, not shown. The nut may be secured to the camera through the slot beneath the shelf 4. As will be explained in greater detail hereinafter, the camera which may be a standard type 35 millimeter such as for example a Chinon CE4 camera manufactured by Chinon is loaded with a 35 millimeter slide transparency film having an ASA rating such as 64. Any positive or negative film of virtually any ASA rating which enables a developed image to be projected is suitable for use with the present invention. If a positive film is employed in the camera 10, a positive print film is used in the printing process to make the ultimate three-dimensional photograph, while if a negative film is used in camera 10, a negative print film is used in the printing process to make the ultimate three-dimensional photograph unless special effects require reversal of the film. The camera 10 is used to expose a series of area of the film within the camera at different predetermined and registered positions within track 6 or 8. Track 6 which is more linear than tack 8 can be used for distant objects while track 8 is used for objects closer to camera 10. The curvature of the tracks 6 and 8 is a matter of design choice.

Figure 2:
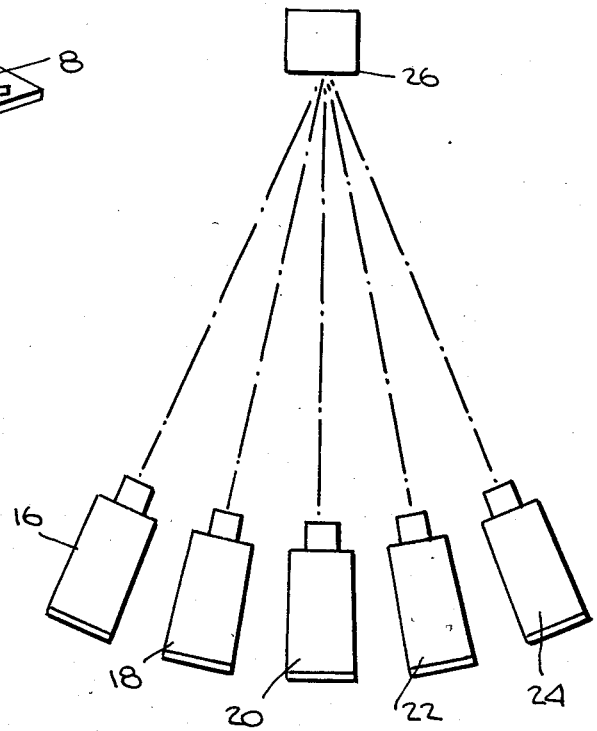
FIG. 2 is a diagramatic view of an alternate embodiment of photographic apparatus for use in the present invention involving a plurality of multiple cameras adapted to a simultaneously photograph a subject.

Reference is now made to FIG. 2. FIG. 2 shows an embodiment involving a plurality of cameras 16, 18, 20, 22 and 24 all simultaneously actuated to photgraph a single object 26 from different angles. The cameras 16-24 can be similar to camera 10. The number of cameras, as the number of positions of camera 10 where different views are shot, corresponds to the number of separate images that are desired to be latter exposed on another film which will be developed and mounted so as to form the three-dimensional photograph to be viewed. As the number of exposed original images of the subject increases, the quality of the three-dimensional photographic print is enhanced. The simultaneous actuation of cameras 16-24 shown in FIG. 2 provides a set of images on the film within each camera of the same object 26 from a different angle.

Figure 3:
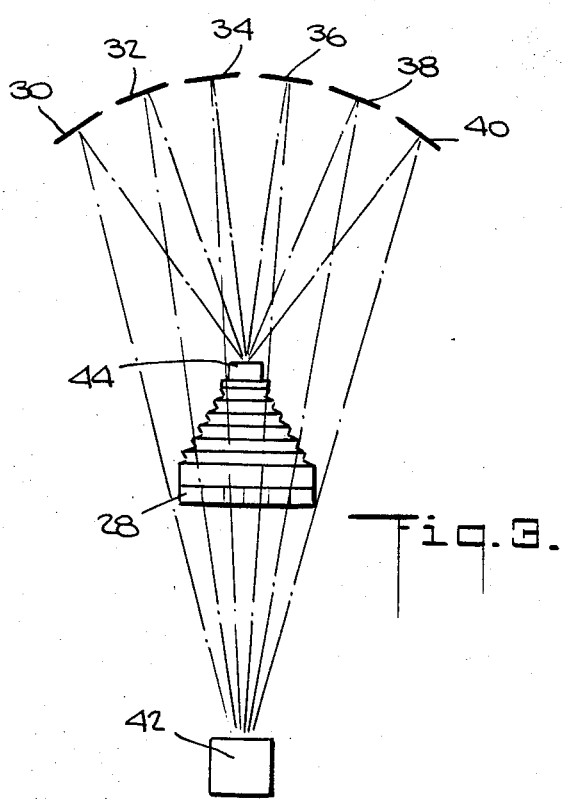

FIGS. 3 and 3a represent an embodiment wherein a single camera 28 is employed with a plurality of mirrors of 30, 32, 34, 36, 38 and 40 to simultaneously obtain a series of exposed film areas of objects 42 from different angles. In this particular embodiment, the size of lens system 44 for the camera is such that separate portions of the film within camera 28 are exposed by separate images reflected from each of the mirrors. The camera 28, as is most clearly shown in FIG. 3a, is positioned below the line of convergence of the mirror system comprising mirrors 30-40 so as not to interfere with the viewing of the object 42 on the film within the camera 28.

The reflection from object 42 by the six mirrors of the system 30-40 results in a separate and distinct image being formed on six separate and distinct portions 43 of the film within the camera. A suitable camera, film, lens and mirror for use in the present system are a Horseman 4X5 View Camera, manufactured by Komomura Photographic Company, Ltd. Ektachrome 4X5 sheet film manufactured by Eastman Kodak Company and a 210 mm lens such as Fujinon manufactured by Fuji Corp. for close up portait type work.

Figure 4:
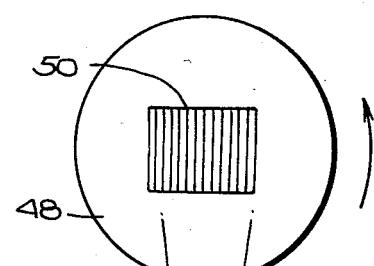
FIG. 4 is a diagramatic view of an embodiment of the present invention employing a motion picture camera or motorized camera with the object being photographed positioned on a moving mount.

Reference is now made to FIG. 4. A motion picture camera 46 is used in conjunction with a turntable 48 to obtain a series of exposed images in different perspectives of object 50. While motion picture camera 46 is actuated to film the subject 50, turntable 48 is rotated resulting in different frames of the film within motion picture camera 46 being exposed to different perspective of subject 50. As an alternative to employing a motion picture camera, a 35 millimeter camera with a motor drive may be employed.

It should be recognized with reference to FIG. 1 that the positioning of camera 10 within track 6 to 8 can be motorized and controlled to result in the camera positioned in registration at various positions along the track for sequential exposure of the subject. In a like manner, it shoud be recognized that turntable 48 of FIG. 4 can be eliminated and camera 46 mounted on a movable mechanism to obtain various images of the object 50 by movement of the camera 46.

This embodiment of FIGS. 1-4, demonstrates various equipment which will allow a series of different photographs to be systematically taken from different perspectives of a subject. The spacing of separate viewpoints, whether achieved by multiple cameras, sequential shots with one camera, rotation of the subject or the use of mirrors, is to be adjusted for the optimum perception of depth. This may be defined by the traditional variables used by the Polaroid Inter Occular Calculator, for example, for determining the parallax for shooting standard stereoscopic pictures with the additional consideration that this optimum determination is usually assigned to the image viewed by each eye from the average, typical, or desired distance from the final display. This would normally define the distance between average exposures, for example, cameras 18 and 22 in FIG. 2. See "Polaroid Interocular Calculator", Samuel Kitrosser *Photographic Science and Technique* Section B of the Photographic Society of America Journal, Volume 19B, Number 2, Pages 74-76, May 1953.

The total parallax should not exceed comfortable hypestereoscopic viewing for the normal interpupilary viewing distance. The remaining cameras, mirrors, spacings and the like should ideally be equally spaced within that range. Even though this optimization is sought, there is enough flexibility in the systems described herein to compensate for non-optimal spacing while still rendering acceptable images.

With reference to both FIGS. 5 and 6, both showing the photographic print apparatus of the present invention, a rectangular outer frame 82, has a rectangular wood backing 94, to which the bearing tracks 86, 88, 90, 92 are bolted, one at each corner of the frame 82. Strong plastic sheeting 93 covers the side of a wood backing 94 nearest the lens 95. It should be recognized that the enlarger shown in FIGS. 5 and 6 is not to scale with the film mount 64. The dimensions of the enlarger 97 and film mount 64 are such that the projected image onto the film mount 64 has the desired size. For example, it may be desired that the projected image is as large as the entire sheet of flim 124 mounted to the optically clear acrylic separator 128. A ½ inch thick, 47 inch by 64 inch O.D., 45 inch by 62 inch I.D., rectangular outer frame 96 is bolted to the entire periphery of the wood backing 94 on the side of the wood backing 94 nearest the lens 92. An air-tight sealant 98 surrounds the periphery of the outer frame 82 at the junction of the wood backing 94 and outer frame 96.

A rectangular acrylic vacuum port 100 is mounted in a rectangular opening 101 in the center of the wood backing 94 and the plastic sheet 93. The acrylic vacuum port 100 has a vacuum tube passage 102 on the side 104 of the vacuum port 100 facing away from the lens 95 of enlarger 97. The side 104 of the acrylic port 100 facing away from lens 95 (not shown in FIG. 5) is taped or glued with air-tight tape or glue, such as epoxy cement, to the plastic sheet 93 around the entire opening of the sheet 93 surrounding the port 100. The side 106 of the acrylic vacuum port 100 facing the lens 95 has a rectangular outer periphery that is flush with surface of the side of the plastic sheet 93 nearest the lens 95. However, an irregular cavity 108 cut in the flush side 106 of the vacuum port 100 leads to and joins with the vacuum tube passage 102. A vacuum tube 110 penetrates the vacuum tube passage 102 and an air-tight sealant joins the vacuum tube 110 to the vacuum tube passage 102. The end of vacuum tube 110 opposite the vacuum port 100 is attached to a vacuum generator (not shown) capable of drawing a vacuum of 21 inches of Hg.

As shown in FIG. 5, the inner frame 84 is vertically rotatable within the outer frame 82 by means of two hinges 112, joining the lowest horizontal side of the outer frame 82 nearest to the lens 95 with the inner frame 84. The dimensions of the outer periphery of the inner frame 84 are nearly identical to the dimensions of the inner periphery of the outer frame 82. Thus, when the inner frame 84 is rotated about the hinges 112, into a vertical position within the outer frame 82, the side of the inner frame 84 nearest the lens is flush with the side of the spacer 96 nearest the lens 95. The inner frame 84 is only one-quarter inch deep so that there is a one-quarter inch separation between the wood backing 94 and inner frame 84.

A one-quarter inch thick corrugated cardboard spacer 116 is glued to the inner frame 84 and covers the entire surface of the inner frame 84 facing towards the wood backing 94 when both the cardboard spacer 116 and inner frame 84 are in the vertical position. The cardboard spacer 116 thus occupies the space in the separation between the plastic sheet 93 and the inner frame 84 when the inner frame 84 is flush with the outer frame 82. As shown in FIG. 5, the inner surface 118 of the cardboard spacer 116, which abuts the platic sheet 93 when the inner frame 84 is in the vertical position, has two vertical slits 120, 122, one in each vertical side of the cardboard spacer 116. The slits 120, 122 penetrate the corrugation in the cardboard spacer 116 to provide a means for air to pass from the inner surface 118 of the cardboard spacer 116 to the passages within the corrugation in the cardboard spacer 116.

As shown in FIG. 6 for the film mount 64 when loaded with film 124, the inner frame 84 with the inner periphery of the outer frame 82. by means of air-tight sealing tape 126 surrounding the entire junction of the outer periphery if the inner frame 84 with the inner periphery of the outer frame 82.

The inner periphery of the inner frame 84 is rectangular and forty-three inches wide (horizontal) and sixty inches tall (vertical). A forty-three by sixty by one-quarter inch rectangular, optically clear acrylic separator 128 is mounted within the inner periphery of the inner frame 84 so that the sixty inch sides if the separator are vertical and the forty-three inch sides are horizontal and abutting the horizontal sides of the inner frame 84. A sixty by forty-three inch line raster 130 is aligned and laminated to the acrylic separator 128 by means of a one mil thick optically clear, double sided sheet adhesive 132, such as Mac Tac, manufactured by Morgan Adhesives, Stowe, Ohio. The line rastor 130 is laminated to the side of the acrylic separator 128 nearest the lens. The acrylic separator 128 and line rastor 132 are retained within the inner frame 84 and plastic sheet 93 so that the line rastor 130 is flush with the surface of the inner frame 84 facing the lens by means of air-tight sealing taps 134 surrounding the entire junction of the inner periphery of the inner frame 84 with the outer periphery of the line rastor 130.

The line rastor 130, when oriented vertically in the film mount 64, has vertical lineations an is 80% dark with a 1/40"–1/51" periodicity. The line rastor 130 is made from Kodak Kodalith orthographic Type 3 film. The acrylic separator 128 has an index of refraction of 1.49 and is made from acrylic sheeting manufactured by Rohm & Haas Manufacturing Co.

The film 124 lies between a removable cardboard insert 136 and the side of the acrylic separator 128 facing away from the lens. The cardboard insert 136, which is about ¼" thick, thus lies between the plastic sheet 93 and the film 124. The film 124 and cardboard insert 136 are also each forty-three inches wide by sixty inches tall and are each mounted in the inner periphery within the inner frame 84 so that the sixty-inch sides are vertical and the forty-three inch sides are horizontal and abutting the horizontal sides of the inner frame 84.

The film 124 is Ilford Cibachrome II CTD.F7 transparency film with a 0.18 mm. transparent polyester base. The ASA rating of the film is about 1/54 of an ASA unit. The film 124 is very stable dimensionally so that, after the film 124 is developed, the film 124 retains dimensions nearly identical to the pre-exposure dimensions of the film 124. Any film which tests under ANSI specification (PH 1.32-1979) to change size less than 0.02% after processing and under the ambient temperature and humidity variations (10% RH or 5 degrees Celsius) are considered to be suitable.

As shown in FIG. 5, the cardboard insert 136 has corrugations that mate with the corrugations of the cardboard spacer 116. A vacuum passage 138 is cut in the center of the cardboard insert 136 on the side of the cardboard insert 136 that, as shown in FIG. 6, abuts the acrylic vacuum port 100. The cardboard insert 136 is mounted within the inner periphery of the inner frame 84 so that the vacuum passage 138 abuts the vacuum port 100 and allows air to be drawn through the corrugations in the cardboard spacer 116 and cardboard insert 136. The tape 134, 126 used to seal the sandwich of materials within the outer frame 82 and inner frame 84 is a strong plastic sheet, such as polyethylene 4 mil sheet, capable of creating an air tight seal at 21" Hg. Thus, when the sandwich of material is sealed in the film mount 64 and a vacuum is drawn through; the vacuum port 100, the cardboard insert 136 is drawn into tight, intimate, and secure contact with the plastic sheet 93 and with the film 124, and the film 124 is brought into tight, intimate, and secure contact with the acrylic separator 128.

It can thus be seen that the outer frame 82, sealant 98, sealing tape 126, inner frame 84, plastic sheet 83, and vacuum port 100 from a container for the cardboard spacer 116, cardboard insert 136, film 124, acrylic separator 128, and line rastor 130. The container is sealed by means of the sealing tape 134 and line rastor 130 so that the area bounded by the container, the sealing tape 134, and the line rastor 130 is relatively air-tight and capable of providing the vacuum described above.

Other container arrangements would also suffice to provide the vacuum sandwich of materials described herein. For example, a plastic envelope that is at least partially optically clear can serve as a container for the sandwich of materials including the cardboard insert 136, the film 124, the acrylic separator 128, and the line rastor 130 and when the envelope is sealed, a vacuum can be drawn to draw the sandwich securely together.

It should be noted that a different diffusion system for the vacuum arrangement may be employed in the structure shown in FIGS. 5 and 6. Specifically, a sheet of perforated masonite may be placed between the vacuum port 110 and the corrugated cardboard 116. This results in enhanced diffusion of the vacuum for more even pressure of the film within the sandwich against the plexiglass.

The enlarger 97 shown in FIGS. 5 and 6 has a film mount 140 loaded with a developed film 142. The developed film 142 includes a series of separate exposures taken by any one of the camera systems shown in FIGS. 1-4 of an object. The developed film 142 within the enlarger is such that it is suitable, in conjunction with light source 144, to project an image through lens 94 onto the film mount of 64. The enlarger 97 is of the type having a bellows 146 such that in conjunction with a mechanism 148, lens 95 can be moved through a plurality of laterally spaced positions. The lens is moved by means of turning an adjustment screw drive mechanism operated by natural knob 150.

As can most clearly be seen in FIG. 7, the film 142 which includes a series of images 152 can be positioned within the film mount 140 to cause selected images on the film to be aligned with aperture 154 in the film mount 140. The film is advanced by means adjustment knob 156 and is locked into position by means of locking mechanism lever 158. A suitable film mount having these features is the Negatrans film transporter manufactured by the Charles Besseler Company. It should be recognized in operation an image 152 can be positioned within aperture 154 such that by movement of knurled knob 150, lens 95 can be positioned to project an image of the film portion onto different areas of the film mount 74.

In operation, developed film 142 having a plurality of exposed and developed film portions views, such as 11 views, of a subject from left to right in sequence is mounted within the enlarger 97. If the film has 11 views of a particular subject, in accordance with the preferred embodiment, the center image or image 6 is moved and positioned within aperture 154 of enlarger 97. The enlarger is adjusted to focus the projection of image 6 on a cover slip 160 on the film mount 64 with the hinge frame closed in the vertical position. The cover slip 160 rides in tracks 162 and 164 such that it can be used to cover an unexposed film within the film mount 64 with the film track in its center position. For the 11 positions shown in FIG. 5, the center position for the film mount 64 is the "6" position 162. At this time, an area or edge the film image projected onto the surface around the cover slip 160 is marked. For example, the outer boundaries of the projected image are marked by masking tape. These markings are used for registration purposes as will be hereafter explained. With all of the lights turned off, the film, such as the previously noted Cibachrome film, is loaded into place behind the optically clear acrylic separator 128 and the film mount 64. The film is thus mounted in place and thereafter the mount is sealed as previously explained.

With the slip cover in place covering the Cibachrome film to prevent exposure and with the film track still centered in the "6" position (designated by reference numeral 162) the film 152, shown in FIG. 7, is positioned within aperture 154 so that the left-most image (the first image 152a) projected film frame image 152a is aligned with the registration marks (the masking tape). At this time, with the film 142 locked in place by the locking mechanism 158, the film mount 64 is moved to its left-most number "11" position (designated by reference numeral 164). The knurled knob 150 is operated to move the lens 95 laterally until the film frame is once again registered with the registration marks of the masking tape. At this time, the cover slip 160 is drawn from tracks 162 for a 1 minute exposure at f/5.6. The cover slip is thereafter replaced. This sequence of actions places a vertically lineated image of the "left most" original view (projected film image 152a) onto the film stock in the film mount 164.

The enlarger locking lever 158 is thereafter unlocked and the number 2 image 152b is moved within film mount 140 and positioned within the aperture 154 such that the projected film frame image 152b is in registration with the registration masking tape marks on the film mount 164. Again the locking mechanism 158 is operated to lock the film 142 in place, The film mount is then moved to the number 10 position designated by reference numeral 168. The projected film image 152b is then reregistered on the registration masking tape marks by movement of the enlarger lens 95 by means of knurled knob 150. This process of movement of the film 142 to align the next film image so that its projection aligns with the masking tape registration marks, thereafter moving the film mount 64 to its next position and reestablishing projected image registration by movement of lens 95 is repeated. The number of repeated operations depends on the number of exposed images of the film 142. The process begins with the center image "6" because the center image represents the average perspective and should be used for this "cropping" step of nominal image placement. Nevertheless, any of the images may be used to set the nominal or actual exposures for final printing.

It should be expressly noted that the movement of the image mount and the movement of the film 142 and the relationship of the exposed images of the object by the camera, such as camera 10, have a predetermined relationship. The movements of the film track apparatus are defined by what it takes to fully interlace images behind each space in the raster. Noting that each vertically lineated component of the image is placed adjacent to a similar vertical slice of the next image in the sequence, full interlacing is defined as when sequential images are touching but not overlapping with the first and last images of the sequence being likewise intimately adjacent but with the last and first images, respectively, of the neighboring sequences of slices. The variables that go into this are a distance from the film track apparatus to the lens, the thickness of the plexiglas spacer, the periodicity of the raster, the width of the raster opening and taking into consideration any movement of the enlarger lens as well. The preferred parameters of these various structural elements as used by applicant are ¼" acrylic separator with an 80% dark, 51 line/inch rastor. It is possible to use other thicknesses of acrylic separators or other rastors as long as slit width (the width of an optically clear lineation on the rastor), lens-to-rastor distance, and thickness of acrylic separator are all matched on the basis of laws governing Fresnel diffraction phenomena. The Fresnel diffraction phenomena is described in Vibrations, Waves and Diffraction by Henry John James Braddick on pages 62 to 72, published by McGraw-Hill, New York (1966). For example, I have used a ⅛" acrylic separator with an 80% dark, 63 line/inch rastor and obtained excellent results. The object is to concentrate a single bright Fresnel zone behind each rastor during each exposure of the film. The movement of the film mount 64 is compensated by the movement of the lens 95 so that the axis of the lens 95 optical system is centered on the aperture 154 within the film mount 140. In the preferred embodiment the lens 95 is mounted on a track that is parallel to the film mount 140 and the film mount 64. Relative movement of any two of these components could achieve the results as long as the line of projection of the images passed through all of them. It should also be noted that swiveling the film mount 64 could be employed to accomplish a similar interlacing of successive images. In this case the film mount 140 would also be swiveled to prevent "keystoning" of the projected image and to insure uniform focus across the projection plane.

As will be recognized from the foregoing description, that in accordance with the present invention, a portable camera can be employed to take a series of photographic images from different perspectives of an object and thereafter, the developed film employed to project images onto the above described three-dimensional photographic prints thereby achieving the noted advantages.

Reference is now made to FIGS. 8-10. FIGS. 8-10 disclose an embodiment of the present system wherein the emulsion on the film print need not be separated from the raster structure during development so that registration problems which may be introduced when reassembling the raster onto the developed emulsion for viewing are avoided.

With specific reference to FIG. 8, a box 170 having a gasket 172, fabricated for example from rubber, is mounted at the edges of the sandwich assembly of the clear acrylic plastic spacer 174. The rubber gasket 172 covers the raster 176 and emulsion 178 each formed as part of a single assembly with the spacer. It should be noted that the emulsion is mounted with its substrate against the clear acrylic plastic spacer 174. The emulsion is fabricated in layers which maybe inverted to accommodate the emulsion substrate being mounted against the acrylic spacer 174 such that the emulsion is exposed through the substrate when used in the equipment shown in FIGS. 5 and 6. It should be recognized that the acrylic plastic spacer 174 and constitute the substrate for the emulsion 178, thereby avoiding the need to expose through the emulsion substrate. With this the structure shown in FIG. 8, the emulsion can be placed in a developer solution without contaminating the raster or the acrylic spacer 174 with developer fluids.

Referring now to FIG. 9, a tank of developer fluid 180 is provided with a spray mechanism 182. Developer solution is sprayed onto the emulsion 178. Alternatively, a motorized drive 84 can drive the sandwich assembly through a developer solution in a "kiss" process wherein the developer fluid laps against the emulsion without touching other portions of the sandwich. With reference to FIG. 10, it is noted that the raster pattern 186 can be mounted to the space in any of a number of ways, for example, the raster canbe mounted to the spacer by being formed directly on a clear acrylic plastic spacer 188 in a manner such that the emersion of the exposed emulsion 190 into a developer solution will not adversely affect the structure. The raster also can be mounted to the spacer by coating the spacer with an optically clear resist impervious to the chemicals used to develop the exposed emulsion. The SFT 1000 optically clear laminate manufactured by Morgan Adhesives is an example of such a resist.

What is claimed is:

1. A method of forming a three-dimensional photograph, comprising:
    (a) projecting images in a sequence from a film stock means having a plurality of images of a subject, onto a structure including an optically clear spacer having substantially parallel first and second surface, a raster mounted to a first surface of said optically clear spacer and photosensitive material mounted to said second surface of said optically clear spacer and shutter means mounted between said raster side of said structure and said first film stock means for controlling exposure of said photosensitive material to projected images of said first film stock means.
    (b) said projecting sequence including projecting a first one of said film stock means images onto said structure and establishing a defined projected image area on said structure;
    (c) causing relative movement between said structure and said film stock means;
    (d) projecting a second one of said film stock means images onto said structure in said defined image area on said structure such that the line of projection of said image is at a different angle as measured relative to said structure; and, said relative movement between said structure and said film stock means being of an amount to substantially fully interlace images behind each space in said raster.

2. The method of claim 1 further including projecting at least a third one of said images from said film stock means said third image being projected at an angle as measured relative to said structure different from the lines of projection fron said first and second images on said image area of said structure.

3. A method of forming a three-dimensional photograph as defined in claim 1 wherein said images on said film stock means are projected onto said structure through lens means and wherein said second one of said film stock means images is projected onto said structure in said defined image area on said structure by moving said lens means.

4. A method of forming a three-dimensional photograph as defined in claim 2 wherein said structure is moved in a substantially perpendicular direction to the line of the axis of projection of said film stock means images onto said image area on said structure is and the first one of said film stock images intermediate the end positions of the relative movement of said structure when exposing said second and third ones of said film stock means to the projected image area on said structure.

5. A method as defined in claim 3 wherein said structure is moved relative to the projection lens in the order of ¼ to 4 inches after projecting and exposing said structure to said projected first one of said film stock means images and before exposing said structure to a projected image of a second one of said film stock means images.

6. Apparatus for simultaneously exposing a film to a plurality of different views of a subject comprising:
   camera means having lens means and a film stock support means for supporting a film to be exposed;
   an arcuate mirror system means positioned with respect to a subject to be photographed and said camera means for simultaneously reflecting a plurality of different views of said subject to said lens means;
   said mirror system means and said subject defining an optical path, and said camera means mounted in a position outside of said defined optical path between said mirror system means and said subject; and
   said lens means, said film stock support meand and said arcuate mirror system means dimensioned so that distenct and separate views of said subject are simultaneously imaged on separate and distinguished portions of a film stock when mounted in said film stock support means.

7. A method of forming a three-dimensional photograph as defined in claim 6 wherein said raster is a line raster and wherein spacing between said successive raster lines is between 0.1 and 0.02 inches.

8. A method of forming a three-dimensional photograph as defined in claim 1 wherein said plurality of images on said film stock means are formed in part by exposing said subject through a system, comprising:
   camera support means;
   camera means mounted to said camera support means; and guide means for controlling movement of said camera means along an arcuate path such that said subject can be photographed by said camera means to form a plurality of points of view along said arcuate path.

9. A method of forming a three-dimensional photograph as defined in claim 8 wherein said arcuate path is a straight path.

10. A method of forming a three-dimensional photograph as defined in claim 1 wherein said plurality of images on said film stock means are formed in part by exposing said subject through a system comprising:
    a plurality of separate camera means, each of said separate camera means mounted to photograph said subject from a different point of view.

11. the method of claim 10 wherein the separate camera means photograph said subject substantially simultaneously.

12. A method of forming a three-dimensional photograph comprising:
   (a) projecting images in a sequence from a film stock means having a plurality of images of a subject, onto a structure including an optically clear spacer having substantially parallel first and second surfaces, a raster mounted to a first surface of said optically clear spacer and photosensitive material mounted to said second surface of said optically clear spacer and shutter means mounted between said raster-side of said structure and said first film stock means for controlling exposure of said photosensitive material to projected images of said first film stock means
   (b) said projecting sequence including projecting a first one of said film stock means images onto said structure and establishing a defined projected image area on said structure;
   (c) causing relative movement between said structure and said film stock means;
   (d) projecting a second one of said film stock means images onto said structure in said defined image area on said structure such that the line of projection of said image is at a different angle as measured relative to said structure;
   said plurality of images on said film stock means are formed in part by exposing said subject through a system, comprising:
   camera means having a lens means and a film stock support means; and
   and arcuate mirror system means positioned with respect to said subject and said camera means for simultaneously reflecting a plurality of different views of said lens means of said camera means.

13. A method of forming a three-dimensional photograph as defined in claim 12 wherein said mirror system means and said subject define an optical path and said camera means is mounted in a position outside of said defined optical path between said mirror system means and said subject.

14. A method of forming a three-dimensional photograph as defined in claim 13 wherein said camera lens means, said camera film stock support means and said arcuate mirror system means are dimensioned so that distinct and separate views of said subject are simultaneously imaged on separate and distinct portions of film stock means when mounted said camera film stock support means.

15. Apparatus for forming a three dimensional photograph, comprising:
   (a) means for projecting in a sequence a plurality of images on a first film stock means mounted within said means for projecting;
   (b) a structure including a optically clear spacer having substantially parallel first and second surfaces, said first surface of said optically clear spacer capable of having mounted thereto a photosensitive material, a raster mounted to said second surface of said optically clear spacer and shutter means for controlling exposure from said first film stock means to said first surface of said optically clear spacer;
   (c) structure support means contacting said structure for movably supporting said structure such that said means for projecting is adapted to project and image of said plurality of images on said spacer means, said support means adapted to relatively move said structure in a substantially perpendicular direction to the line of the axis of said images projected by said means of projecting said relative movement between said structure to the line of the axis of said images projected by said means of projecting being of an amount to substantially fully interlace images behind each space in said raster.

16. An apparatus as defined in claim 15 including a registration means associated with said structure and wherein said projecting means includes movable lens means for moving the projected image with said means for projecting in a fixed position by moving said lens means, said movable lens means adapted to be adjustable to move said projected image relative to said registration means of said structure when said structure is positioned at different points along a path of movement of said structure.

17. A method of forming a three-dimensional photograph comprising:
(a) projecting images in a sequence from a first film stock means having a plurality of images of a subject through a lens system onto a structure including an optically clear spacer having parallel first and second surfaces, a raster mounted to a first surface of said optically clear spacer, photosensitive material mounted to said second surface of said optically clear spacer and shutter means for controlling exposure of said photosensitive material to projected images of said first film stock means;
(b) said projecting sequence including projecting a first one of said first film stock means images onto said structure in a defined projected image area on said structure;
(c) relatively moving said structure and said first film stock means; and
(d) projecting a second one of said first film stock means images onto said moved structure a said predetermined image area on said structure and relatively moving said lens system through which said first film stock means images are projected said relative movement between said structure and said first film stock means being of an amount to substantially fully interlace images behind each space in said raster.

18. An apparatus for forming a three-dimensional image comprising:
means for mounting a film stock means, said mounting means including an aperture for positioning a frame of film having an image to be projected;
light source means mounted on one side of said film mount means aperture;
projection means mounted on another side of said film mount means aperture;
means for moving at least one of said means for mounting a film stock means and projection means and adapted to project images on different lateral areas of a plane perpendicular to the line of the axis of projected images by relative movement of one of said projection means and film stock mounted means, said relative movement between projecting means and said film stock mount means being of an amount to substantially fully interlace images behind each space in said raster.

19. An apparatus as defined in claim 6 wherein said mirrors are in a parabolic arcuate pattern.

20. A photographic structure, comprising:
a transparent spacer having first and second substantially parallel sides,
a raster pattern formed on said first spacer side;
a photosensitive material bonded to said second spacer side with said photosensitive material uncovered so that a developer material to make photographic patterns of said photosensitive material visible can direcly contact said photosensitive material for development whereby said photosensitive material may be developed without being removed from said spacer, and
support means attached to edges of said spacer perpendicular to said first and second spacer sides, said support means mounted preventing developer from contacting said spacer and said raster when said material is immersed in a developer material.

21. A photographic structure, comprising:
a transparent spacer having first and second substantially parallel sides
a raster pattern formed on said first spacer side;
a photosensitive material bonded to said second spacer side with said photosensitive material uncovered so that a developer material to make photographic patterns of said photosensitive material visible can directly contact said photosensitive material for development whereby said photosensitive material may be developed without being removed from said spacer; and
drive means for automatically driving said spacer along a predetermined path and developer spray means for spraying developer material on said photosensitive material as said drive means drives said spacer along said predetermined path.

22. A method of forming a three-dimensional photograph as defined in claim 1 wherein the thickness of said optically clear spacer, the width of optically clear lineations on said raster and the distance from said raster to a lens means through which said images on said film stock means are projected onto said structure are dimensioned to concentrate a single bright Fresnel zone behind each raster during each exposure of said photosensitive material.

23. Apparatus as defined in claim 15 wherein the thickness of said optically clear spacer, the width of optically clear lineations on said raster and the distance from said raster to said means for projecting are dimensioned to concentrate a single bright Fresnel zone behind each raster during each exposure of said photosensitive material.

* * * * *